United States Patent [19]

Komurasaki et al.

[11] Patent Number: 4,755,737

[45] Date of Patent: Jul. 5, 1988

[54] CONTROL DEVICE FOR VEHICLE MOUNTED GENERATOR

[75] Inventors: Keiichi Komurasaki; Shiro Iwatani, both of Himeji, Japan

[73] Assignee: Mitsubishi Denki Kabushiki Kaisha, Tokyo, Japan

[21] Appl. No.: 923,995

[22] Filed: Oct. 28, 1986

[30] Foreign Application Priority Data

Oct. 29, 1985 [JP] Japan ............................... 60-244544

[51] Int. Cl.[4] ............................................... H02P 9/00

[52] U.S. Cl. ......................................... 322/99; 322/28; 320/64; 361/21; 361/91

[58] Field of Search ....................... 322/28, 99; 320/64; 361/91, 21

[56] References Cited

U.S. PATENT DOCUMENTS 3,492,559 1/1970 Harris .................................... 322/99

4,143,313 3/1979 Arendt .................................. 322/99

4,262,243 4/1981 Mori et al. ............................ 322/99

4,280,087 7/1981 Kasiewicz ............................ 322/99

*Primary Examiner*—Patrick R. Salce

*Assistant Examiner*—Anita M. Ault

*Attorney, Agent, or Firm*—Sughrue, Mion, Zinn, Macpeak and Seas

[57] ABSTRACT

A protection circuit for use in a vehicle mounted generator 1 equipped with a voltage regulator 3 having an output transistor circuit 306 connected to a field winding 102 of the generator and an overvoltage alarm device 4 having an overvoltage detector, comprises diodes 410, 411 for selectively connecting an output of the overvoltage detector to the output transistor circuit so that the transistor circuit is turned off only when an overvoltage caused by the generator which becomes out of control of the voltage regulator due to disconnection of a generator output to a battery to be charged thereby and/or of the battery to the voltage regulator is detected to terminate a power supply to the field winding until the output voltage of the generator reduces to a preset level.

2 Claims, 3 Drawing Sheets

CONTROL DEVICE FOR VEHICLE MOUNTED GENERATOR

BACKGROUND OF THE INVENTION

The present invention relates to a control device for controlling the output voltage of a vehicle-mounted generator.

An example of a conventional control device is shown in FIG. 1 in which a generator 1 is driven by an engine (not shown). The generator 1 includes an armature winding 101 and a field winding 102. The control device further includes a full-wave rectifier 2, a voltage regulator 3 and an over-voltage alarm 4.

The full-wave rectifier 2 functions to rectify the a.c. output voltage of the generator 1. The rectifier 2 has a main output terminal B connected to a terminal of a battery 9, an output terminal T connected to the field winding 102, the voltage regulator 3, and the over voltage alarm 4, and another output terminal E is grounded.

The voltage regulator 3 includes a voltage divider composed of series-connected resistors 301 and 302 one end of which is connected to the positive terminal S of the battery 9 to detect the battery voltage at a junction of the resistors. The voltage regulator 3 further includes another voltage divider composed of series-connected resistors 303 and 304 one end of which is connected to a constant voltage source A for supplying a constant voltage thereto when a key switch 5 of the engine is closed to start the latter. At the junction of the series-connected resistors 303 and 304, a fraction of the constant voltage is provided as a reference voltage.

A comparator 305 included in the voltage regulator 3 has an inverted input connected to the junction of the voltage divider 301, 302 and a non-invered input connected to the junction of the voltage divider 303, 304. A Darlington pair 306 of output transistors is connected to the comparator such that it is on-off controlled by the output of the comparator 305. A base resistor 307 is connected to a base of the Darlington pair 306, and a surge absorbing diode is connected in parallel to the field winding 102.

The over-voltage alarm 4 is composed of an output transistor 401 having a base resistor 402, a current limiting resistor 403 connected to the output terminal T of the rectifier 2, a Zener diode 404 connected to a base of a transistor 405, a pair of series-connected resistor 406 and 407 constituting a voltage divider for detecting a voltage of the output terminal T of the rectifier 2, a Zener diode 408, and a transistor 409 which, together with the Zener diode 408, detects an over-voltage.

The rectifier 2, the voltage regulator 3 and the over-voltage alarm 4 are usually mounted on the generator as a unit.

The key switch 5 is connected through a resistor 7 and a reverse current blocking diode 6 to the terminal T for supplying a current to the field winding 102 for an initial energization thereof.

In operation, when the key switch 5 is closed to ignite the engine, an initial energization current flows from the battery 9 through the switch 5, the diode 6 and the resistor 7 to the field winding 102 to make the generator 1 ready to operate. A potential at the output terminal T of the rectifier 2 under this condition is at a relatively low level which is a fraction of the battery voltage due to the presence of impedances of the resistor 7 and the field winding 102. At the same time, a base current is supplied from the battery 9 through the key switch 5 and the base resistor 402 to the output transistor 401 to turn the latter on, so that an alarm lamp 8 is lit.

When the engine starts, the generator 1 starts to generate an a.c. voltage which is full-wave rectified by the rectifier 2, resulting in a d.c. voltage at the output terminal B with which the battery 9 is charged gradually up to the battery voltage. With the gradual charging to the battery voltage, a voltage at the junction of the series-connected resistors 301 and 303 of the voltage regulator 3 increases and, when the voltage at the junction exceeds the reference voltage of the comparator 305, the latter provides a low level output "L", so that the base of the output transistor 306 is grounded to turn itself off to thereby cut the power supply to the field winding 102.

When the power supply to the field winding 102 is cut, the generator 1 stops to generate and, thus, the terminal voltage of the battery 9 and hence the voltage fraction at the junction of the resistors 301 and 302 gradually decrease below the reference voltage of the comparator 305, ultimately, so that the output of the comparator 305 becomes a high level "H", upon which the output transistors 306 are turned on to supply power to the field winding 102 to thereby operate the generator 1. The voltage regulator 3 controls the output voltage of the generator 1 by repeating the above mentioned cycle of operation such that the terminal voltage of the battery 9 becomes constant.

On the other hand, for the over-voltage alarm 4, the voltage at the output terminal T of the rectifier 2 is applied through the current limiting resistor 403 to a cathode of the Zener diode 404. When the voltage at the terminal T exceeds the Zener voltage of the diode 404, the latter and hence the transistor 405 are turned on and the output transistor 401 is turned off to extinguish the alarm lamp 8, indicating that the generator is operating normally.

When a connection of the battery 9 to the output terminal B of the rectifier 2 of the device under operation is broken due to incorrect setting and/or abnormal vibration of the vehicle, the battery 9 is no longer supplied with the output voltage from the generator 1 and, thus, its terminal voltage and hence the voltage at the junction between the resistors 301 and 302 are not increased any more. Therefore, the output of the comparator 305 remains at the high level, holding the conduction state of the output transistors 306. Thus, the voltage control of the voltage regulator 3 becomes impossible and the output voltage of the generator 1 and hence the field current may increase abnormally, resulting in damage to the output transistors 306.

On the other hand, when a connection to terminal S of the battery 9 is broken for similar reasons, the voltage at the junction between the resistors 301 and 302 becomes zero and the output of the comparator 305 is held at the "H" level and the output transistor 306 may be damaged, similarly. If the connection to terminal B is maintained correctly under such condition, an abnormally high voltage may be applied to the battery 9 as well as other electrical loads of the device which are not shown, causing the lives of these components to be shortened. For the over-voltage alarm 4 under these conditions, the voltage divider composed of the series-connected resistors 406 and 407 is supplied with the voltage at the terminal T of the rectifier 2 and, when the voltage at the terminal T reaches an over-voltage detection value set by the Zener voltage of the Zener diode 408 and the dividing ratio of the divider, the Zener diode 408 and hence the transistor 409 are turned on and the transitor 401 is turned off. Thus, the output transitor 401 is turned on to light the alarm lamp 8, indicating that the generator 1 is out of control of the voltage regulator 3. That is, the over-voltage alarm 4 can indicate only an over-voltage condition and there is no protective function provided.

U.S. Pat. No. 4,349,854 discloses a power generation control system including an abnormal voltage detection dircuit which has a function of cutting an output Darlington pair of a voltage regulator off when the B terminal voltage exceeds a set voltage, to stop a power supply to the field winding to thereby stop the power generation.

In this abnormal voltage detection circuit, however, once the Darlington pair is cut off, it can not be turned on again unless the key switch is opened. That is, the abnormal voltage detection circuit disclosed in U.S. Pat. No. 4,349,854 has no function of regulating the generator output.

SUMMARY OF THE INVENTION

An object of the present invention is to provide an overvoltage alarm device which is capable of indicating an overvoltage condition and which includes a protective circuit capable of restricting a generation of abnormally high voltage output of a vehicle mounted generator when a connection to a battery terminal (B) of a rectifier and/or to a sense terminal (S) of a battery is broken and a voltage regulator is inoperative.

The protection circuit connects an overvoltage detection portion of the overvoltage alarm to an output transistor portion of the voltage regulator such that the output transistor is turned on upon a detection of an overvoltage.

The electrical connection circuit between the overvoltage detection portion and the output transistor of the voltage regulator operates to turn off the output transistor forcedly when the overvoltage condition is detected by the detection portion, to cut a field current of the generator to thereby prevent the output voltage of the generator from being abnormally high.

DETAILED DESCRIPTION OF THE PREFERRED EMBODIMENTS

Figure 1:
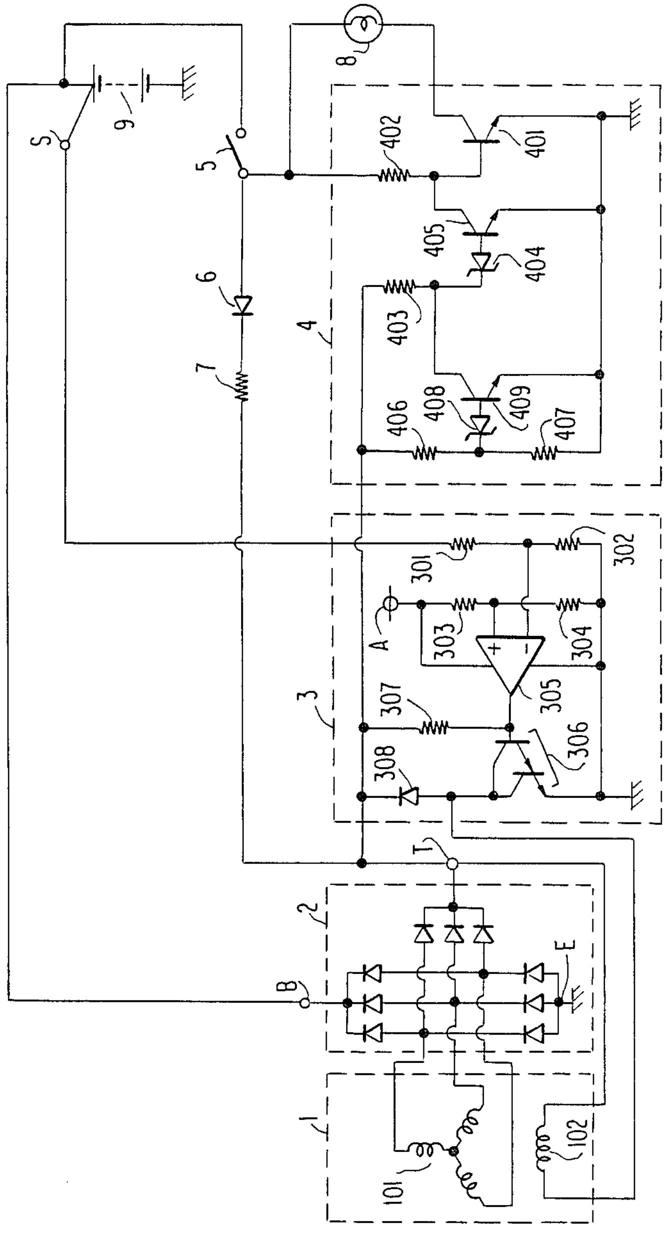
FIG. 1 PRIOR ART
FIG. 1 is a circuit diagram of a conventional vehicle mounted generator including a fullwave rectifier, a voltage regulator and an overvoltage detection circuit.
Figure 2:
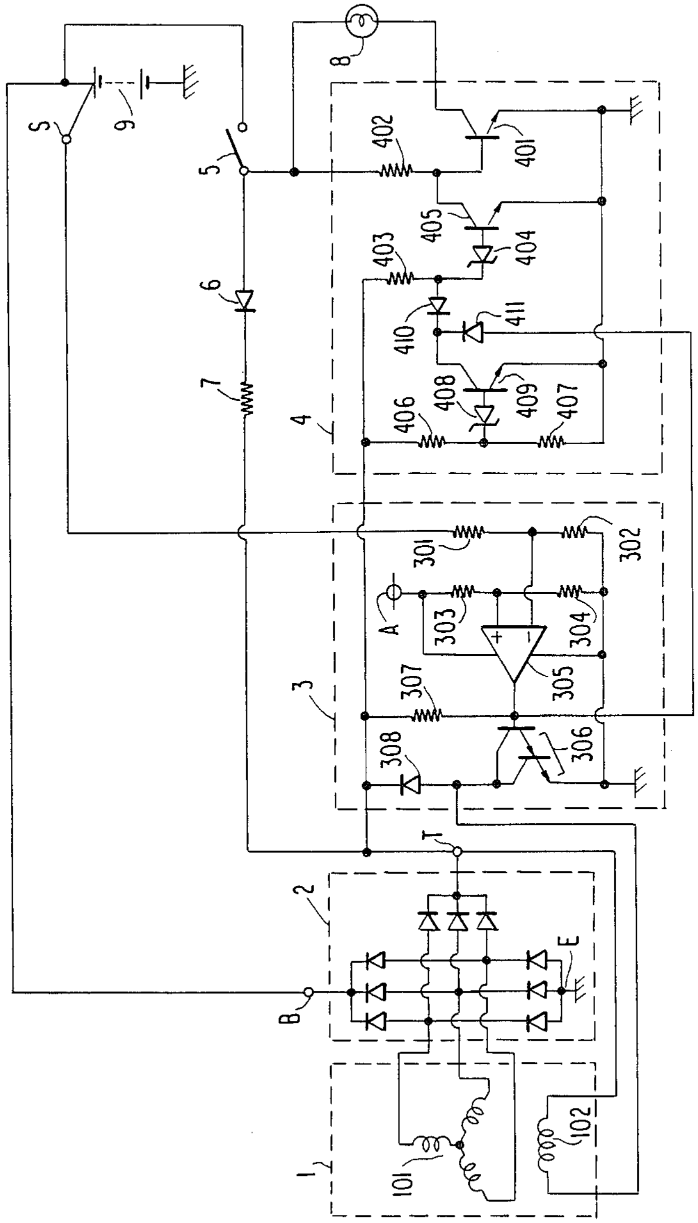
FIG. 2 is a circuit diagram of an embodiment of the present invention.

In FIG. 2 which is similar to FIG. 1 and in which the same or corresponding elements to those shown in FIG. 1 are depicted by the same reference numerals, respectively, diodes 410 and 411 are provided for blocking reverse currents, respectively, in the circuit shown in FIG. 1, the construction and operation of which have been described in detail.

Cathodes of the diodes 410 and 411 are connected commonly to a collector of an overvoltage detection transistor 409 and an anode of the diode 410 is connected to the cathode of Zener diode 404. An anode of the diode 411 is connected to the base of the Darlington pair 306 of output transistors of the voltage regulator 3. Other elements and operations thereof are the same as those described with reference to FIG. 1 and so detailed explanations thereof except portions related to the present invention are omitted for avoidance of duplication.

In operation, when respective connections to a battery terminal B of a fullwave rectifier 2 for rectifying an a.c. output voltage of a generator 1 and to a sense terminal S of a battery 9 are broken for some reasons when the circuit is operating normally, the voltage regulator 3 is disabled to control the output voltage of the generator 1, allowing the latter to generate an abnormally high output voltage as mentioned for conventional circuit shown in FIG. 1. Thus, the overvoltage alarm 4 recieves the abnormally high voltage through the retifier 2 to turn the overvoltage detection transistor 409 on. Upon the conduction of the latter transistor, the cathode of the Zener diode 404 is grounded through the diode 410 and the latter transistor, causing the Zener diode 404 and transistor 405 to turn off and the output transistor 401 to turn on, to thereby lighten an alarm lamp 8.

On the other hand, the base of the Darlington pair 306 of the output transistors of the voltage regulator 3 is grounded through the diode 411 and the overvoltage detection transistor 409 and thus the Darlington pair 306 is turned off to thereby cut the field current to the field winding 102. When the current to the field winding 102 is cut, the generator 1 stops to operate and, thus, its output voltage decreases gradually. When the output voltage of the generator 1 reduces below the overvoltage detection value set in the overvoltage alarm 4, the transistor 409 is turned off again and, thus, the Zener diode 404 is turned on, so that the transistor 405 is turned on and then the transister 401 is turned off to thereby extinguish the alarm lamp 8.

At the same time, a base current is supplied to the base of the Darlington pair 306 of the voltage regulator 3 to turn it on to thereby supply a field current to the field winding 102. With the supply of the field current, the generator 1 starts to operate again to increase its output voltage.

Thus, even if the voltage regulator 3 is out of normal operation, the output voltage of the generator 1 can be controlled by the detection voltage set in the overvoltage alarm 4 without sacrifice of alarming function thereof.

Figure 3:
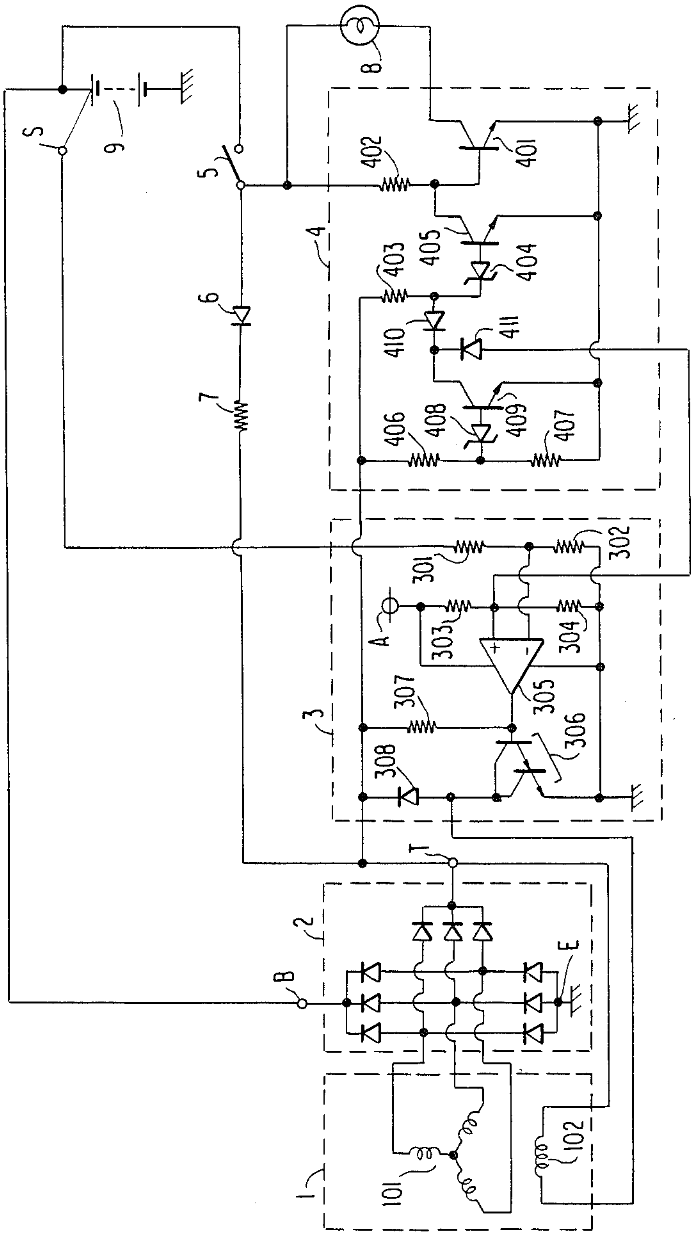
FIG. 3 is a circuit diagram of another embodiment of the present invention.

FIG. 3 is another embodiment which differs from the embodiment in FIG. 2 only in that the anode of the diode 411 is connected not to the base of the Darlington pair 306 but to the junction of the series connected resistors 303 and 304 such that the junction is grounded when an overvoltage is detected so that the output of the comparator 305 is made "L" level forcedly to turn the Darlington pair 306 off.

As mentioned herinbefore, the overvoltage alarm 4 according to the present invention is capable of not only indicating an overvoltage condition but also regulating the output voltage of the generator when the voltage regulator becomes inoperative due to a breakage of the connection to the terminal S of the battery. This function is very effective when, under the above condition, the connection of the battery and/or other loads to the terminal B of the generator is still complete.

What is claimed is:

1. A protection circuit for use in a vehicle mounted generator, comprising: a voltage regulator (3) having output transistor means (306) connected to a field winding (102) of said generator for regulating an output voltage of said generator by controlling a field current thereof, an overvoltage alarm circuit (4) including an overvoltage detector (406–409) for energizing an alarm (8) in response to an excess output voltage of said generator, and means for connecting said overvoltage detector of said overvoltage alarm circuit to said output transistor means such that an output transistor of said output transistor means is turned off when said overvoltage detector detects an overvoltage, wherein said connecting means comprises a diode circuit (410, 411) connected directly to a base of said output transistor of said voltage regulator.

2. A protection circuit for use in a vehicle mounted generator, comprising: a voltage regulator (3) having output transistor means (306) connected to a field winding (102) of said generator for regulating an output voltage of said generator by controlling a field current thereof, an overvoltage alarm circuit (4) including an overvoltage detector (406–409) for energizing an alarm (8) in response to excess output voltage of said generator, and means for connecting said overvoltage detector of said overvoltage alarm circuit to said output transistor means such that an output transistor of said output transistor means is turned off when said overvoltage detector detects an overvoltage, wherein said connecting means comprises a diode circuit (410, 411) connected through a voltage reference portion (303, 304) of said voltage regulator to a base of said output transistor thereof.

* * * * *